United States Patent [19]
Walden

[11] 4,041,544
[45] Aug. 9, 1977

[54] DC TO AC INVERTER HAVING IMPROVED SWITCHING EFFICIENCY, OVERLOAD AND THERMAL PROTECTION FEATURES

[75] Inventor: John P. Walden, Schenectady, N.Y.

[73] Assignee: General Electric Company, Schenectady, N.Y.

[21] Appl. No.: 641,997

[22] Filed: Dec. 18, 1975

Related U.S. Application Data

[62] Division of Ser. No. 516,773, Oct. 21, 1977, Pat. No. 3,956,684.

[51] Int. Cl.² ............................................. H02H 7/122
[52] U.S. Cl. ...................................... 361/106; 363/56
[58] Field of Search ................. 317/41, 40 R, 33 SC; 323/69, 68; 340/228 R; 73/362 SC, 342

[56] References Cited

U.S. PATENT DOCUMENTS

| | | | |
|---|---|---|---|
| 3,622,849 | 11/1971 | Kelly, Jr. et al. ................. | 317/41 X |
| 3,701,004 | 10/1972 | Tuccinardi et al. ................. | 323/69 |
| 3,908,162 | 9/1975 | Marley et al. ................. | 323/68 X |
| 3,916,263 | 10/1975 | Abbott ................. | 317/40 R |
| 3,943,434 | 3/1976 | Haeusler et al. ................. | 323/69 |

*Primary Examiner*—J. D. Miller
*Assistant Examiner*—Patrick R. Salce
*Attorney, Agent, or Firm*—Jerome C. Squillaro; Joseph T. Cohen

[57] ABSTRACT

An AC electrical output is produced in the secondary windings of a transformer by alternately switching DC current in a primary winding with active element switches whose alternate switching action is controlled by the stored energy variations in a tertiary winding included with the output transformer and by a high efficiency switching control circuit which facilitates the switching transition of the active elements. This control is achieved in part, by providing a current sensitive latch which is triggered to its conductive state when a predetermined level of primary winding current is detected to thereby initiate a switching transition. This latch circuit is connected to conduct stored electrical charge with respect to the active element switch during the switching transition thus facilitating and promoting the efficiency of the switching operation. In addition, this same current sensitive latch is utilized to terminate normal inverter operations during excessive inverter load conditions and/or in response to detected excessive operation temperatures. In this latter regard, a special thermal protection circuit is employed for triggering the current sensitive latch. The special form of thermal protection circuit is especially adapted to protect integrally formed integrated circuits and is itself integrally formed therewith in a preferred embodiment. The thermal protection circuit includes a temperature sensitive element having a predetermined voltage versus temperature variation at a given current level in combination with a current regulation circuit for supplying and substantially maintaining a predetermined current level through the temperature sensitive element. A special form of periodic restarting circuit is also disclosed wherein another current sensitive latch is utilized to provide periodic starting pulses in the absence of normal inverter operation and to supplement control circuit and switching circuit supply currents during normal inverter operations.

4 Claims, 3 Drawing Figures

DC TO AC INVERTER HAVING IMPROVED SWITCHING EFFICIENCY, OVERLOAD AND THERMAL PROTECTION FEATURES

This is a division, of application Ser. No. 516,773, filed 10/21/74, now U.S. Pat. No. 3,956,684.

This invention generally relates to electrical inverter circuits for converting a DC electrical input into an AC electrical output. More particularly, this invention relates to such an inverter which has improved switching efficiency, overload protection and thermal protection features. In addition, the thermal protection circuitry itself forms a part of this invention as a thermal protection circuity generally usable for an integrally formed integrated electrical circuit which provides an electrical signal representative of the temperature of the integrated electrical circuit thus enabling protective action to be taken such as disablement of the integrated circuit operation.

In general, the basic inverter circuit utilized with this invention is of the type which produces an AC electrical output in a transformer secondary winding in response to the alternate switching of DC electrical input current in a magnetically coupled primary transformer winding. The alternate switching operation is carried out using active element switches such as transistors having appropriate power and switching characteristics. In addition, a tertiary winding is also magnetically coupled to the primary transformer winding and is electrically connected to the control elements of the active element switches so as, to a first order, control the alternate "one"-"off" switching operations of the active element switches by virtue of the variations in stored energy therein as represented by corresponding variations in the voltage and current across and through the tertiary winding. In combination with the tertiary winding, a switching control circuit is also utilized to effect more clean-cut and efficient switching operation. This general type of inverter circuit is, for instance, described in U.S. Pat. No. 3,781,638 issued Dec. 25, 1973, and commonly assigned with the instant application.

This same general type of inverter circuit is further described in connection with certain improvements in the forced switching control circuitry thereof in a copending commonly assigned application of John P. Walden and Thomas E. Anderson entitled INVERTER HAVING FORCED TURNOFF and filed concurrently herewith. The inverter described in the instant application includes some of these improved fatures (such as synchronously switching the emitter leads of the active element transistor switches) which features, per se, form no part of the instant invention except insofar as they have been included herewith to complete the description of the presently preferred embodiment of the instant invention.

Rather, the instant invention, constitutes a further improvement in the basic type of inverter circuit described above over circuits such as those shown in the above-named patent and copending patent application.

In part, the invention to be described below involves an improvement in the electrical control means utilized for controlling the switching operation of the active element transistor switches in such an inverter circuit. In particular, a current sensitive latch means (e.g., an SCR or its reasonable equivalent) is utilized in a high efficiency switching control circuit. This current sensitive latch is triggered to its conductive state by the detection of a predetermined level of current where, in general, this same current level detection is also utilized for controlling the switching operation as described in the above mentioned patent and patent application. This current sensitive latch is electrically connected to conduct stored electrical charge with respect to the active element transistor switches during their transition between alternate switching operations. In this manner, stored electrical charge in the transistor switching elements per se, is quickly dissipated during the transition period thus facilitating the switching operation itself and the efficiency thereof. In the preferred embodiment, NPN transistor switches are utilized and the current sensitive latch is connected through a diode to the base element of each of these transistor switches. When the switch point is detected by detecting a predetermined current flow in the transformer windings, a sequence of circuit actions is initiated to turn one transistor switch off and the other transistor switch on. At the beginning of such a switching transition, there is an appreciable base current and stored electrical charge associated with the base element of the transistor switch then in its on state and then in the process of being transitioned to its off state. To facilitate the transition and the efficiency of such a transition operation, the current sensitive latch is triggered as noted above to quickly dissipate this stored electrical charge, etc., associated with the base element of the transistor switch being transitioned to its off state. This will, of course, give rise to a current flow through the just triggered current sensitive latch. However, due to the inherent characteristics of the current sensitive latch, as the dissipation nears completion during the transition process, the current flowing through the latch will decrease below a predetermined lower limit whereat the current sensitive latch automatically resets itself to a non-conductive state thus readying itself and the remainder of the switching control and switching circuitry for another cycle of operation.

This current sensitive latch in the high efficiency switching control circuitry also permits the efficient shut down of the inverter circuitry during excessive inverter load conditions. That is, if the inverter load conditions should become excessive the current sensitive latch will be automatically triggered prematurely (with respect to normal inverter operations) to quickly and efficiently terminate the then occurring cycle of inverter operation. Furthermore, when triggered prematurely this current sensitive latch also acts to dissipate energy from the tertiary winding and/or to prevent the storage of sufficient energy therein to initiate any further succeeding cycles of inverter operation. Accordingly, the whole inverter operation is quickly and efficiently shut down whenever excessive inverter load conditions are encountered.

This invention also incorporates a thermal protection circuit which is connected to trigger the current sensitive latch to its conductive state in response to a detected temperature rise above a predetermined maximum level thus also automatically terminating normal inverter operations during abnormal temperatures occurrences in the same manner as already described with respect to the inverter shutdown during excessive inverter load conditions. Furthermore, the thermal protection circuit itself has several unique aspects which form another part of this invention. For example, in the preferred exemplary embodiment, the thermal protection circuit elements are integrally formed in an integrated circuit fashion with the switching control circuitry, etc., so as to reliably detect and respond to the actual temperature of the integrated circuit components which are to be protected thereby. Furthermore, in the preferred exemplary embodiment, the thermal protection circuit includes at least one temperature sensitive element having a predetermined voltage variation with respect to temperature variations at a predetermined current level (e.g., a silicon diode or a plurality thereof) in combination with a current regulation means which is connected to supply and substantially maintain the desired predetermined current level through the temperature sensitive elements except for possible current variations which occur as a fuction of temperature and which occur in a direction for enhancing the temperature sensitivity of the thermal protection circuit.

The preferred exemplary embodiment of this invention also includes a starting circuit which, in the absence of normal inverter operation, periodically generates the starting pulse which conditions the active element switches and the electrical control therefore to initiate a current flow in the primary winding of the transformer. If normal load conditions, temperature conditions, etc., then prevail, this action will initiate a first cycle of inverter operation and the inverter will begin to oscillate in a self-sustaining fashion. However, if abnormal temperature or abnormal load conditions, etc., still prevail, the current sensitive latch described above will prematurely terminate this starting cycle of inverter operation thus effectively preventing the inverter from resuming its normal sustained oscillations. Furthermore, this starting circuit itself includes another current sensitive latch which is periodically triggered to its conductive state in the absence of normal inverter operation to thereby deliver the starting pulses mentioned above. This second current sensitive latch is adapted to remain in its conductive state during normal inverter operations and to prevent the generation of further starting pulses during normal inverter operation. In the absence of normal inverter operation, this second current sensitive latch reverts to its non-conductive state thus readying the starting circuit for the production of the periodic starting pulses. Preferably, the repetition rate of the periodic starting pulses is considerably less than the normal operating frequency of the inverter so as to conserve energy during abnormal inverter operating conditions such as excessive load, excessive temperature, etc.

These and other objects and advantages of this invention will be more fully appreciated and understood by reading the following detailed description taken in conjunction with the accompanying drawings, of which:

Figure 1:
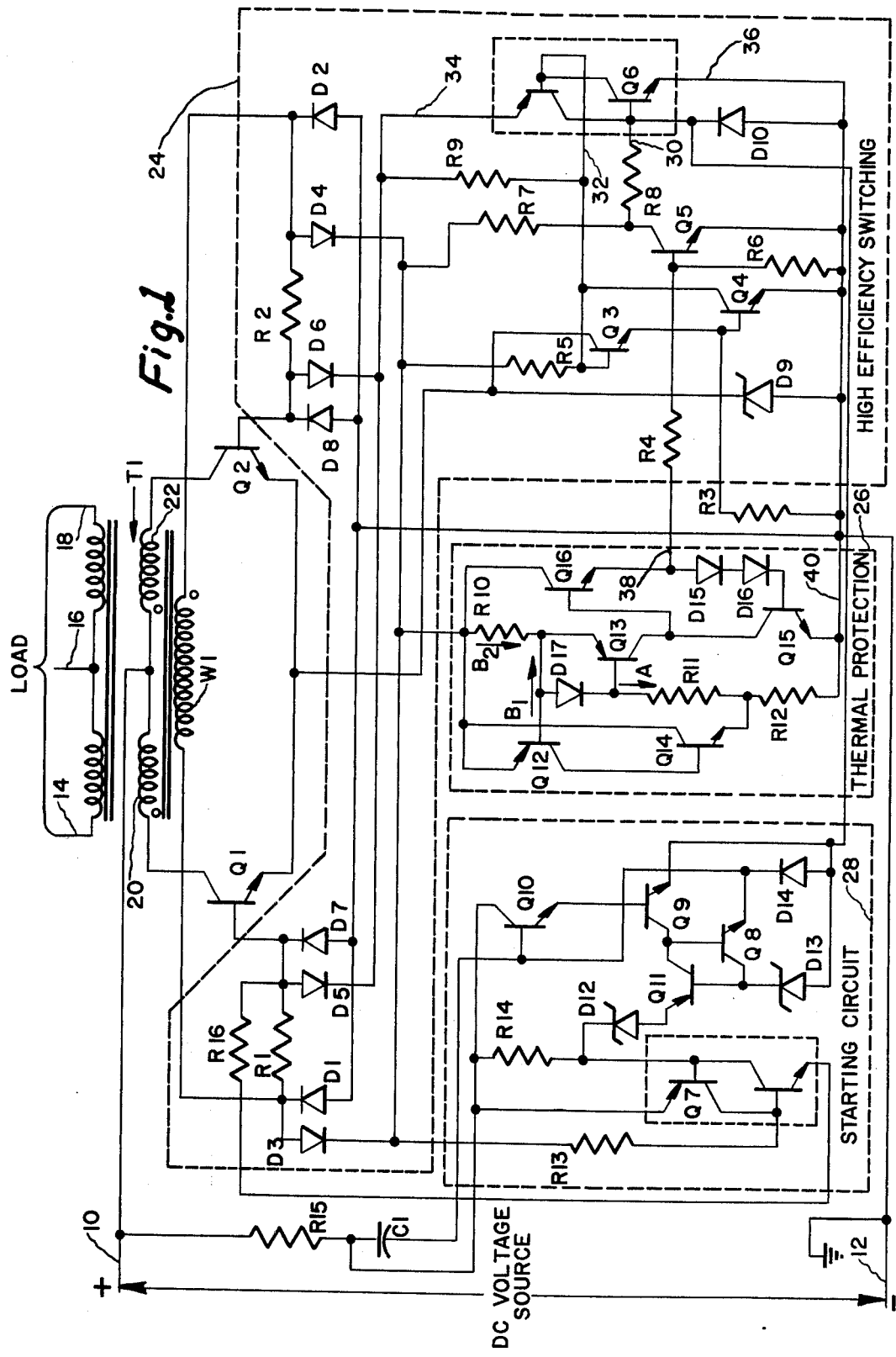
FIG. 1 is a detailed schematic diagram of the electrical circuit for a preferred exemplary embodiment of the invention.

The inverter shown in FIG. 1 utilizes a DC voltage source input applied across lines 10 and 12 and produces therefrom a AC electrical outlet to be applied to a load at output lines 14–18. In general, the inverter of FIG. 1 may be described as a self-sustaining oscillatory inverter employing two power transistors Q1 and Q2 for alternately switching the DC supply current through primary windings 20 and 22 respectively. The switching operation of transistors Q1 and Q2 is controlled by a tertiary winding W1 in conjunction with high efficiency switching control circuitry 24, thermal protection circuitry 26 and starting control circuitry 28.

The preferred exemplary embodiment shown in FIG. 1 is especially adapted for construction as an integrally formed integrated circuit (except for the power switching transistors Q1 and Q2, the transformer T1, resistor R3, resistor R15 and capacitor C1). Furthermore, in the preferred exemplary embodiment, normal inverter operation is at a relatively high frequency (e.g. 25 Khz) to minimize the necessary sizes of power circuit reactors, transformers, capacitors, etc. In a typical application, the inverter of FIG. 1 may be utilized as part of a line cord power supply where the DC voltage source across lines 10 and 12 is produced from an rectifier circuit connected to the usual 100–120 volt AC household power supply and where the AC load connected across lines 14–18 normally comprises another rectifier circuit for rectifying the relatively high frequency AC output of the inverter and producing a low voltage DC output for powering houshold applicances such as radios, phonograph machines, etc. Of course, the inverter circuit of FIG. 1 will also have other applications.

As mentioned above, the preferred exemplary embodiment of FIG. 1 is substantially comprised of monolithic integrated circuit devices for controlling the starting, stopping and high efficiency switching operation of the switching transistors Q1 and Q2 which alternately switch the DC electrical input through the primary windings 20 and 22 respectively. The high efficiency switching control circuitry 24 is utilized to detect the inverter switching point, to provide a low loss power transistor turn off condition during switching transitions and to provide a low loss inverter operation during the period between turn off of one power transistor and the turning on of the other. The thermal protection control circuitry 26 is utilized to initiate inverter shut down under adverse thermal conditions. The starting control circuitry 28 provides inverter starting pulses at periodic intervals and helps maintain the inverter losses at a low level during excessive load conditions by maintaining the repetition rate of such starting pulses well below the normal switching repetition rate of the inverter circuitry. Most of the power required for operating the switching control circuitry, thermal protection circuitry, etc., is obtained from a low voltage tertiary winding W1 during sustained inverter operation. However, the power required to initiate inverter operation is, in the preferred exemplary embodiment, provided by the starting circuit 28 from the DC voltage source applied to lines 10 and 12.

As will be appreciated from the following detailed description of the FIG. 1 circuit, resistor R15 and capacitor C1 will have relatively large component values (to produce a high RC time constant and a consequent low repetition rate for the starting pulses) and resistor R3 will have a relatively low component value (to minimize losses since substantially all of the primary winding current passes therethrough). Since such extreme component values are not easily achieved with current monolithic integrated circuit construction techniques, the present preferred embodiment utilizes discrete components for R3, R15 and C1. The transformer T1 will, of course, also comprise a discrete component. The power switching transistors Q1 and Q2 may comprise discrete components; however, depending upon the power rating and application intended for the inverter circuitry, it may be possible to include the switching transistors Q1 and Q2 with the otherwise monolithic integrated circuit of FIG. 1.

As a starting point for discussions of the detailed circuitry and its operation as shown in FIG. 1, it will first be assumed that the entire circuitry is in an inactive state without the application of any power from the DC voltage source. Initially then, when the DC voltage source is applied to the circuit across lines 10 and 12, capacitor C1 will begin to charge through resistor R15, Q10, the base-emitter junction of Q9 and the base-emitter junction of the NPN component of Q6.

The components Q6 and Q7 are current sensitive latch means which operate in a fashion similar to the traditional SCR circuitry, and in fact may be SCRs if desired, are illustrated as complementary types (e.g., PNP and NPN) transistors which may conveniently be formed in a monolithic integrated circuit structure together with the other components of FIG. 1. Briefly stated, the Q6, for example, can be triggered either from a cathode gate 30 or from an anode gate 32 to its conductive state whereupon current will flow from an anode 34 to a cathode 36 provided that there is a sufficient voltage drop thereacross to cause current to flow in an amount exceeding some predetermined threshold amount. So long as the current continues to flow from the anode to cathode, the current sensitive latch Q6 will be latched in its conductive state, depending upon the input signals applied to gate leads 30 and 32. However, once the anode-cathode current of Q6 decreases below the predetermined threshold limit, the current latch will automatically reset itself to its non-conductive state until once again triggered in a subsequent operation.

The above described charging circuit for capacitor C1 includes a negative feedback transistor Q10 whose function is to increase the charging time of C1 and thus further lower the repetition rate of the starting pulses produced by the starting circuitry 28.

The charging circuit for capacitor C1 as previously described also includes the base-emitter junction of the NPN section of Q6. However, Q6 will not latch to its conductive state at this time since there is insufficient anode current at line 34, and, correspondingly, insufficient cathode-anode voltage across Q6. Nevertheless, the NPN section of Q6 does conduct whatever available current might be present at gate lead 32 thus effectively back biasing the base of transistor Q3 to insure that Q3 is off thus effectively opening the emitter circuit of the power switching transistors Q1 and Q2 as may be seen from FIG. 1.

Furthermore, in this initial start up stage of operations, if there is any base leakage current from power switching transistors Q1 and Q2, this leakage current would be quickly shunted to ground via diodes D5 or D6 and the current latch Q6 while this current latch is in its conductive state because of the charging of capacitor C1 albeit this leakage current would still be insufficient to latch Q6 to its conductive state.

Thus, in the absence of normal inverter operation, while capacitor C1 is charging, the provision of the current sensitive latch Q6 insures a low power dissipation in the power switching transistors Q1 and Q2.

Since the charging current for capacitor C1 passes through the base-emitter junction of Q9, this transistor is turned on thus shunting any leakage current from the emitter-collector circuit of Q11 away from the base of Q8 thereby insuring that Q8 is maintained in its off state in the absence of normal inverter operation during the charging of capacitor C1.

This slow charging process for capacitor C1 continues until the capacitor voltage reaches a predetermined value whereat a sufficient voltage is placed across zener diodes D12 and D13 to cause these diodes to conduct. With zener diodes D12 and D13 now in their conductive state and current flow is through R15, R14, zener diode D12, the emitter-base junction of Q11, the zener diode D13 and the base-emitter junction of the NPN section of Q6. As this alternate current path appears, the base current to Q9 diminishes to turn Q9 to its off state. The resulting collector current from Q11 is then presented to the base of Q8 to turn this Q8 transistor on. Once triggered in this manner, Q8 and Q11 are connected to a regenerative fashion to produce a very low voltage drop between the emitters thereof. As a consequence, the capacitor C1 is partially discharged through the anode gate (emitter-base junction of the PNP section) of Q7 and, in the process, provides sufficient current to trigger Q7 to its on or conductive state. The resulting current flow from the anode to cathode of Q7 through resistor R15, R16, etc., is maintained by trigger input through R13 during normal inverter operation thus inhibiting any further starting pulses.

There is sufficient energy remaining stored in capacitor C1 just after the triggering of Q7 to provide a starting pulse of current by the discharge thereof through Q7 and R16 into the node at the base of switching transistor Q1. This starting pulse provides initial base current to Q1 thus conditioning the base of Q1 for the eventual transition of this element to its on state. In addition, the starting pulse through Q7 and R16 provides a base current to transistor Q3 through resistor R1, diode D3 and resistor R5, and simultaneously through D5 and resistor R9, thus conditioning Q3 to its on state, thereby effectively connecting resistor R3 to the common emitter connection of switching transistors Q1 and Q2. In this manner, both the base and emitter circuits of Q1 are conditioned to turn Q1 on and permit current to flow from the DC voltage source through line 10 to the center tap of the primary winding of T1, through primary winding 20, Q1, Q3 and R3 back to the return line 12 of the DC voltage source.

Finally, in addition, the starting pulse through resistor R16 provides power to the thermal protection circuit 26 through resistor R1 and diode D3 thus enabling the thermal protection circuit to begin operation as will be described in detail below.

The current return path for this starting pulse current to capacitor C1 is through diodes D10 and D14 as can be seen from FIG. 1.

As can now be appreciated, a current flow has been initiated in primary winding 20 comprising inverter load current and transformer exciting current which also flows through Q1, Q3 and R3. As this current flow reaches a designed limit, the current flow increases sufficiently to develop a forward bias voltage across resistor R3 to the Q4 base-emitter junction so as to partially turn transistor Q4 on. When this partial turn on occurs, a portion of the Q3 base current is shunted through the collector-emitter circuit of Q4. This significant reduction in base current to Q3 significantly raises the collector impedance of Q3 thus permitting the emitter potential of Q1 to rise. Concurrently, a portion of the Q1 base current is also shunted to circuit ground via diode D5, the emitter-base junction of the PNP section of Q6 and Q4. However, the current flow through the anode gate 32 of Q6 is not sufficient to trigger Q6 to its conductive state at this time due to a strong reverse bias still being applied to the Q6 cathode gate 30 by the discharge current from C1 flowing through diode D10 and the cathode gate of Q6. Accordingly, the peak collector current of Q1 is thus regulated during the inverter start up phase while capacitor C1 is still discharging.

As this initial start up cycle of the inverter continues, the current flowing in the primary and secondary windings of transformer T1 increases as does the current flowing in the low voltage tertiary winding W1. As should be apparent from the dot convention shown in FIG. 1, the current flowing during this initial start up cycle of inverter operation in primary winding 20 is in a direction so as to cause current to be induced in the tertiary winding W1 flowing from right to left as shown in FIG. 1. Accordingly, as the start up cycle continues, the base current for transistor Q1 is provided from the left end of tertiary winding W1 through resistor R1. In addition, this current from tertiary winding W1 is available through diode D3 to power the switching control circuitry 24 and thermal protection circuitry 26. The return current path to the opposite end of winding W1 is from circuit ground through diode D2 as shown in FIG. 1. Thus, this current flow also provides a form of reverse bias to the Q2 base-emitter junction insuring that this device remains in its off state. On the other hand, if the load impedance connected to the output windings of transformer T1 is abnormally low, insufficient current will be delivered by tertiary winding W1 to maintain circuit operation after the discharge of capacitor C1. Under this abnormal condition, the inverter will automatically shut down near the end of the C1 discharge cycle thus initiating a new starting cycle as just described at a subsequent time interval.

Assuming that normal conditions prevail, a successful starting cycle will continue such that the current flowing through winding 20, Q1, Q3 and R3 increases until the magnetic circuit of transformer T1 begins to saturate. The onset of magnetic saturation causes an increased rate of voltage rise across R3 which acts to completely forward bias the base-emitter junction of Q4 and turn this device to its on state. With Q4 on the base current to Q3 is effectively shunted away therefrom thus turning Q3 off. In addition, the anode trigger lead 32 of Q6 is effectively shorted to ground thus causing sufficient gate current to flow so as to trigger Q6 to its conductive state. This triggering of Q6 is now permitted since the discharge of capacitor C1 will have been completed earlier in this initial start up cycle such that the Q6 cathode gate 30 no longer has a strong reverse bias applied thereto. Accordingly, with Q6 triggered to its conductive state, the base of Q1 is effectively shunted to ground through diode D5 and Q6. As should now also be apparent, the emitter voltage of Q1 is synchronously allowed to rise because of the substantially simultaneous turning off of Q3 by the same action which triggers Q6 to its conductive state. Thus, whenever the trigger point is reached, the base of Q1 is shunted to ground and, simultaneously, the emitter voltage of Q1 is permitted to rise thus rapidly transitioning Q1 from its on state to its off state. As should now be appreciated, the current sensitive latch means Q6 rapidly withdraws all the stored charge from Q1 thus facilitating and promoting a rapid clean cut-off of Q1 in a most efficient manner. Q6 will remain latched to its conductive state so long as there is sufficient current flowing therethrough to maintain it in this state. However, once the stored charge has been withdrawn from the base of Q1 (including the stored charge still flowing thereto through winding W1) falls below the minimum threshold level, Q6 will automatically reset itself to its non-conductive state thereby preparing the controlled circuit for a subsequent cycle of operation as should now be appreciated.

At this point, energy will still be stored in transformer T1. As the electromagnetic components of T1 try to adjust to this change in electrical conditions caused by the turning off of Q1, the Q1 collector voltage will increase while the Q2 collector voltage decreases. As time continues to progress, the Q2 collector voltage may actually fall below circuit ground thus forcing Q2 to momentarily operate in an inverted mode with base current provided via diode D8. This inverted mode of operation effectively clamps the voltage across the transformer windings thus preventing large Q1 collector voltage overshoots.

Subsequently, the Q2 collector current will reverse to the normal direction and, in so doing, induce current in tertiary winding W1 which will supply base current to Q2 via R2 and to the control circuit and thermal protection circuits via diode D4. The return current path to the opposite end of tertiary winding W1 is from circuit ground via diode D1. As before, the voltage drop across diode D1 provides a reverse bias for the base junction of Q1 insuring that Q1 now remains in its off condition while Q2 is on. This second cycle of inverter operation will continue until the transformer magnetic circuit again begins to saturate. As before, the onset of saturation results in increased current through resistor R3 and, accordingly, an increased voltage thereacross which completely forward biases transistor Q4 to its on state. The triggering of Q4 to the fully on state, as before, results in turning Q3 off and in triggering Q6 to its latched on or conductive state to terminate the second cycle of operation. The third and succeeding cycles of operation alternating between the conduction of switching transistors Q1 and Q2 follows as previously described in a cyclic fashion. The base current for inverted mode operation of Q1 is provided by diode D7 in a manner directly analogous to that already described with respect to diode D8 and the inverted mode of operation for switching transistor Q2.

As should now be appreciated, any time the combined load and transformer exciting current passing through resistor R3 reaches the Q4 trip level, the inverter cycle then in progress is terminated. Consequently, if a low impedance or short circuit load is applied to the output of the inverter, the inverter operation then in progress is prematurely terminated. Under these conditions, there will be insufficient stored energy in the transformer T1 to maintain inverter operation. Accordingly, under such abnormally low output impedance conditions, the power stages of the inverter are automatically shut down thus protecting the transformer, switching transistors and other circuit devices from overload conditions. Of course, after such a shut down is experienced, the starting circuit 28 will begin to produce periodic starting pulses (albeit at a much lower rate than the normal switching frequency of the inverter). However, so long as the abnormally low output impedance condition persists, the starting pulses will not be successful in restarting the inverter operation for the reason discussed above.

The thermal protection circuit 26 will be discussed in great detail below. However, for the moment, the general operation of the thermal protection features will be described. For these explanatory purposes, it is sufficient to understand that the voltage appearing at the output of the thermal protection circuit 26 across lines 38 and 40 is inversely related to the temperature of the protected circuitry. Thus, as the temperature increases, the voltage at the emitter of Q16 drops. Over temperature control is provided when the base-emitter potential of Q5 drops to the point where Q5 collector current ceases. When Q5 is thus turned off, the supply current normally flowing through R7 and Q5 is transferred to the Q6 cathode gate 30 via resistor R8. Thus, Q6 is triggered to its conductive state whenever Q5 is turned off by a detected excessive temperature thus causing the entire inverter to shut down in exactly the same manner as when Q6 is triggered to its conductive state by the operation of Q4. The trip point temperature can be varied by alterning the R4, R6 voltage divider ratio as should be apparent.

Zener diode D9 has not yet been referenced. This diode is used conventially to protect the control circuit from over voltage transients during the Q1, Q2 turn-off and start up cycling. Resistors R8 and R9 also serve to help withdraw charge from Q6 thus increasing the speed of turn-off for this device. R14 has a similar purpose for the current latch Q7. The resistor R13 is utilized to inject a small current into the cathode gate of Q7 thus maintaining this device in its on or conductive state during normal inverter operation. By thus maintaining Q7 in its conductive state, the capacitor C1 is prevented from charging thus starting pulses cannot normally occur during inverter operation.

The thermal protection circuit 26 is adapted to measure the internal (rather than some external case temperature etc.) of monolithic integrated circuit structures by providing an output voltage signal representative of the temperature of components within the thermal protection circuit itself which are integrally formed with the integrated circuit structures to be protected. The temperature sensitive voltage provided by the thermal protection circuit can then be used with suitable voltage sensing schemes to provide on — off over temperature control such as that earlier described with respect to Q5 and Q6 in the preferred exemplary embodiment of FIG. 1. It should also be apparent that this voltage signal might be further processed or used as a direct measurement of temperature, etc. in other applications.

The integrated circuit and thermal protection circuitry 26 provides a predictable output signal representative of temperature which requires no external adjustment, a low power consumption and the ability to operate reliably from a totally unregulated power supply. As should be apparent from the foregoing description of the inverter shown in FIG. 1, the power supply to the thermal protection circuitry 26 is variable within considerable extremes thus making the ability of this circuit to function with an unregulated power supply particularly desirable in applications such as that as shown in FIG. 1. As should also be appreciated, since the thermal protection circuitry 26 is itself integrally formed with the circuitry to be protected from excessive temperatures, and since the temperature sensitive elements thereof are quite small, it is possible to accurately sense locally hot temperatures within an integrated or hybrid circuit structure.

Most electronic circuits are subjected to thermal stresses which must be considered in a reliable circuit design. Of usual concern is the higher temperature limit since, if safe operating temperatures of electronic components are exceeded, the circuitry can often fail catastrophically. In conventional design situations, this thermal stress is usually controlled by using suitable heat sinks, fans, or other cooling means to keep the components at or below a sfe operating temperature. However, there are applications where such conventional means are not conveniently applied. For instance, a line cord power supply unit within which the inverter of FIG. 1 might be included, is an application involving a very small volume, a variable thermal input and, in many respects, an uncontrolled cooling air flow. Accordingly, the thermal protection circuit of FIG. 1 effectively protects inverter components from catastrophic failure due to excessive temperature by simply shutting the power circuit down whenever excessive temperatures are detected. Thus, at or above the shut-down temperature, thermal dissipation within the circuitry is largely eliminated thereby allowing the lossy circuit elements to cool. As a consequence, circuits employing this technique can be expected to withstand ambient temperatures without catastrophic circuit failure so long as those temperatures are within nonoperating device specifications.

In general, the thermal protection circuit 26 utilizes at least one temperature sensitive element (e.g., silicon diodes D15, D16, etc.) having a predetermined voltage variation thereacross versus temperature variations thereof at a predetermined current level therethrough. In addition, current regulation means are provided for insuring that the current flow through the temperature sensitive elements are substantially maintained at a predetermined current level except for possible current variations which occur as a function of temperature in a direction so as to enhance the overall temperature sensitivity of the thermal protection circuit 26.

Figure 2:
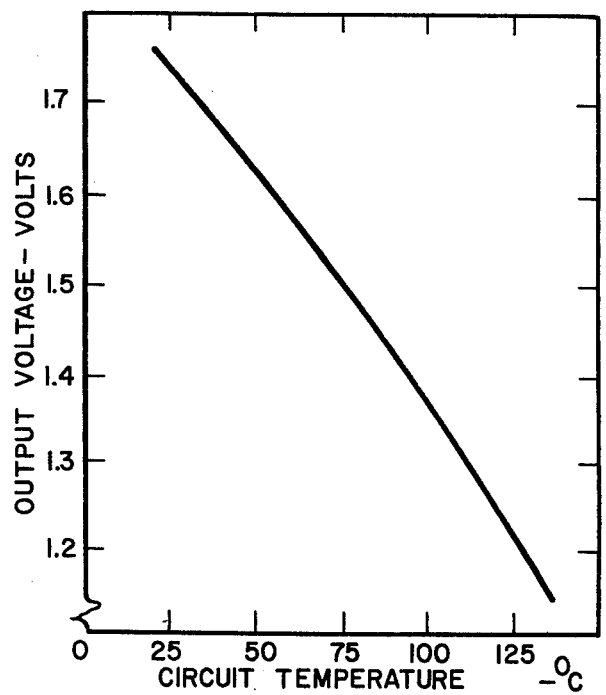
FIG. 2 is a graph showing the output voltage versus circuit temperature for the preferred exemplary thermal protection circuit shown in FIG. 1.

The use of a silicon diode as a temperature sensing element, per se, is known in the art. For instance, such diodes are utilized as temperature compensating devices in circuits such as those shown in U.S. Pat. Nos. 3,050,644 and 3,454,925. However, the use of such diodes as temperature sensors in combination with a current regulation is believed to be unique and novel. This combination of temperature sensitive diodes and current regulation circuitry has been discovered to provide an accurate output temperature indication over a wide (at least two to one) power supply voltage variation thus permitting the use of the thermal protection circuitry 26 with unregulated supplies thereto. Actual variations of output voltage versus circuit temperature for the exemplary preferred embodiment of thermal protection circuitry 26 are shown in FIG. 2.

The temperature sensitive diodes (silicon diodes D15, D16, etc.) are included as the load elements in an emitter follower current amplifier Q16 which is utilized to isolate output loading of the thermal protection circuitry from the operation of the device itself. Actually, in addition to the temperature sensitive diodes D15, D16, the base-emitter junction of Q5 is also temperature sensitive. Since the base-emitter voltage of Q15 is also included in the output voltage from the thermal protection circuit 26, it follows that this output voltage is also affected by the temperature sensitivity characteristics of the base-emitter junction of Q15. However, as will be explained in more detail below, the temperature sensitivity of these diode junctions decreases with increasing quiescent current levels. Furthermore, as will also be explained in detail below, the quiescent current through the emitter of Q15 is significantly higher than the quiescent current maintained through temperature sensitive diodes D15 and D16. Accordingly, the voltage variation at the output of the thermal protection circuitry 26 is chiefly due to the temperature sensitivity of diodes D15 and D16 as should now be appreciated. Preferably, the current level in diodes D15 and D16 is below 10 microamps to insure maximum temperature sensitivity.

To provide an output voltage variation that is predominately caused by the temperature variation of the diode transistor string, the current in these devices must be maintained at an essentially constant level or must be permitted to vary only as a function of temperature.

As a first step towards this required current stabilization, the collector of Q15 is connected to the base of Q16. By means of this arrangement, and increase in the Q13 collector current causes an increase in the diode D15 and D16 current which, in turn, causes a much larger increase in the Q15 collector current. Thus, a large proportion of the increased Q13 collector current is shunted through Q15. Accordingly, the current variations through diodes D15 and D16 are minimized. As should now be appreciated, the opposite effect will occur if the current through Q13 decreases. Since variations in the Q15 emitter current cause significant corresponding variations in the Q15 base-emitter potential, it is seen that the operation of this base-emitter junction at decreased temperature sensitivity (due to the increased magnitude of quiescent current therethrough) is desirable. It is also desirable, insofar as possible, to stabilize the Q13 collector current thus minimizing voltage variations at the output caused by factors other than temperature variations.

Using appropriate conventional integrated circuit device geometries, the Q13 emitter current and the D17 diode current can be caused to be essentially equal. Accordingly, even as temperature is varied, the current ratio of currents through D17 and the emitter of Q13 will hold approximately constant due to the similar Q13 base-emitter and the diode D17 volt-ampere characteristics and to the fact that equal applied voltages are maintained across these junctions due to their parallel electrical connection. Thus, the Q13 collector current will proportionately mirror the current leaving the Q13 base-D17 cathode tie point (current A). Furthermore, current A is large enough to permit the use of desirable resistor values from an integrated circuit construction standpoint (between 10,000 - 20,000 ohms) in the associated circuitry.

Stabilization of current A is achieved by monitoring the current entering the Q13 emitter-D17 anode tie point (currents B1 plus B2). Currents B1 plus B2 flow through the parallel combination of R10 and the Q12 base-emitter junction. Assuming a very low circuit power supply voltage, current B1/ (essentially zero) plus plus B2 will be very low and the voltage developed across R10 will also be low and, in accordance with appropriate design, will be too low to turn on Q12. Thus, Q14 will be off and the current A will be determined by the voltage drop across R11 and R12.

As the circuit power supply voltage is increased, currents A and B1 plus B2 will also increase. Eventually, the voltage drop across R10 will begin to forward bias Q12 and Q14 so that these devices begin to conduct. When this onset of conduction in Q12 and Q14 occurs, the potential drop across R12 will rise (due to the increased current component therethrough) thus reducing the potential drop across R11. This reduced potential drop across R11 causes currents A and B1 plus B2 to decrease correspondingly and, hence, to cause a decrease in the current flowing through Q12 and Q14. In effect, this is a negative feedback action which has been achieved thus stabilizing current B at a level which is determined by the value of resistor R10 and the Q12 base-emitter potential which is required to achieve the necessary negative current feedback.

Accordingly, it should now be recognized that although current B1 plus B2 is effectively isolated from power supply voltage variation effects, it is not stabilized against temperature variations. Increase in temperature will cause a drop in the Q12 base-emitter potential and, therefore, a decrease in the Q13 collector current. However, it should be noted that this change is any direction so as to increase the overall voltage versus temperature sensitivity of the thermal protection circuit 26. Since the current level through the temperature sensitivity elements is effectively controlled by resistor R10, it follows that this resistor can be adjusted to trim the output voltage to a desired value at a given ambient temperature.

Figure 3:
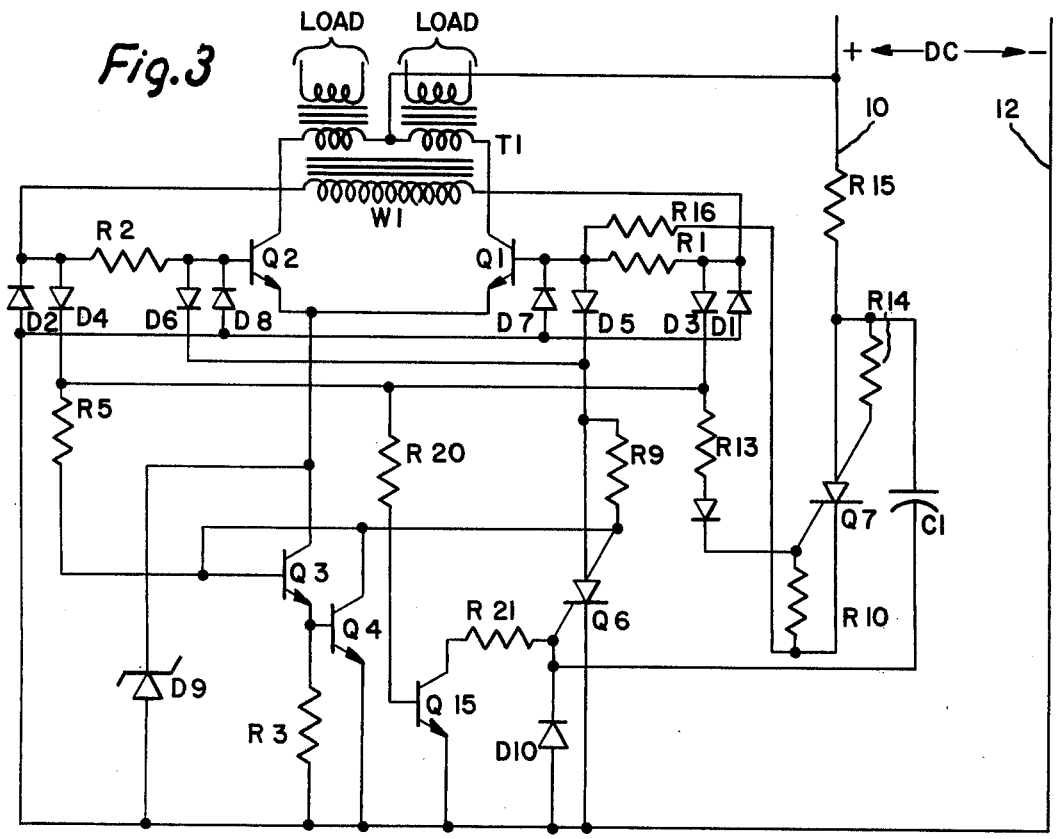
FIG. 3 is a detailed schematic diagram of an electrical circuit comprising an alternate embodiment of an inverter circuit incorporating some of the features of this invention.

The alternative circuit diagram shown in FIG. 3 reveals an inverter circuit having start up and switching control circuitry similar to that shown in FIG. 1. However, as will be noted, there is no thermal protection circuitry associated with circuit FIG. 3. In addition, the circuit of FIG. 3 utilizes discrete SCR current sensitive latches Q6 and Q7. Furthermore, the starting circuitry in FIG. 3 is somewhat simplified with respect to that shown in FIG. 1. For instance, there is no negative feedback in the charging circuitry for capacitor C1. Furthermore, some of the control transistors (e.g., Q8, Q9, Q11) have been eliminated as have zener diodes D12, D13, etc.

However, the basic operation of the circuit shown in FIG. 3 is quite similar to that which has already been explained in FIG. 1. Analogous components have, accordingly, been identified with the same reference characters in FIGS. 1 and 3.

In view of the detailed description that has already been given of the analogous FIG. 1 circuit, an abbreviated description of the operation for the circuit shown in FIG. 3 should be sufficient.

As the DC supply is presented on lines 10 and 12, capacitor C1 is charged through resistor R15 and the cathode gate-cathode circuit of Q6. When a sufficient voltage is reached across capacitor C1, SCRQ7 fires thus applying a starting pulse through resistor R16 to supply base current to Q1 and to turn on Q3 via resistor R9 and diode D5 or resistor R1, diode D3 and resistor R5. The discharge path for capacitor C1 through Q7 in supplying this starting pulse is completed through a diode D10 which also supplies a reverse bias to Q6 thus preventing Q6 from being triggered during this initial start up cycle. AS Q1 turns on, the primary current in transformer T1 increases through Q1 and Q3 through resistor R3. As before, Q4 performs a regulating function. After start-up, transformer T1 begins to saturate, the current increases rapidly through resistor R3 thus turning Q4 on, Q3 off and triggering Q6 (the reverse bias now having been removed from the cathode gate after C1 is discharged) to its conductive state which, through diode D5, quickly drains away the stored charge from the base of transistor Q1 and, through resistor R1, the remaining current flowing in this direction from tertiary winding W1. Accordingly, both the base and emitter of Q1 are actively controlled so as to switch Q1 to its off state. Thereafter, the stored energy in T1 operates as described with respect to the circuitry of FIG. 1 to initiate the conduction of switching transistor Q2 by inducing current of the proper plurality in tertiary winding W1 which, in turn, is supplied to the base of Q2 through R2 and to the base of Q3 through D4 and D5 to complete the conditioning of Q2 for transitioning to its on state. As should now be appreciated, resistors R20, R21 and transistor Q15 are provided to help insure that SCRQ6 remains in its off or non-conductive state except during switching transitions of transistors Q1 and Q2.

Although only a few specific exemplary embodiments of this invention have been described in detail above, those in the art will appreciate that many modifications and variations of these exemplary embodiments may be made without materially departing from the novel and improved aspects of the invention. Accordingly, all such variations and modifications are intended to be included within the scope of this invention as defined by the appended claims.

What is claimed is:

1. A thermal protection circuit for an integrally formed integrated electrical circuit which provides an electrical signal representative of the temperature of the integrated electrical circuit thus enabling protective action to be taken such as disablement of the integrated circuit operation, said protection circuit comprising:

at least one temperature sensitive element integrally formed with said integrated circuit and having a predetermined voltage variation thereacross versus temperature variations thereof at a predetermined current level therethrough, and current regulation means connected to supply and substantially maintain said predetermined current through said temperature sensitive element except for possible current variations as a function of temperature in a direction to enhance the temperature sensitivity of said thermal protection circuit, said current regulation means including first and second transistor means each having base, collector and emitter elements, said first transistor means having its collector and emitter elements electrically connected in a series circuit with a source of electrical current, said temperature sensitive element and the base-emitter circuit of said second transistor means, the collector of said second transistor means being connected to the base of said first transistor means and also operatively connected to said current source for by-passing at least a portion of non-temperature related current variations therefrom around said temperature sensitive element;

said electrical signal being produced as the voltage across said temperature sensitive element.

2. A thermal protection circuit as in claim 1 wherein said temperatue sensitive element comprises a silicon diode.

3. A thermal protection circuit as in claim 1 wherein said first transistor means and said temperature sensitive element are connected as an emitter-follower current amplifier to minimize the effect of output loading on the operation of said thermal protection circuit means.

4. A thermal protection circuit as in claim 1 wherein said current regulation means further comprises:

third transistor means having an emitter-collector circuit electrically connected through a sensing resistor means to said current supply and having an emitter-base element circuit electrically connected in parallel with an integrally formed diode structure having volt-ampere characteristics with a predetermined relationship to the volt-ampere characteristics of said emitter-base element circuit whereby the current flowing through the emitter-collector circuit is controlled, and sensing circuit means connected to said sensing resistor and to said current source for detecting currents therethrough in excess of a predetermined value and for supplying negative feedback control on the emitter-collector circuit current of said third transistor means in response thereto.

* * * * *